United States Patent [19]
Glew et al.

[11] Patent Number: 5,951,670
[45] Date of Patent: Sep. 14, 1999

[54] SEGMENT REGISTER RENAMING IN AN OUT OF ORDER PROCESSOR

[75] Inventors: Andrew F. Glew, Madison, Wis.; Michael A. Fetterman, Hillsboro, Oreg.

[73] Assignee: Intel Corporation, Santa Clara, Calif.

[21] Appl. No.: 08/923,496

[22] Filed: Sep. 4, 1997

Related U.S. Application Data

[60] Provisional application No. 60/025,585, Sep. 6, 1996.

[51] Int. Cl.$^6$ ........................................ G06F 15/00
[52] U.S. Cl. ..................... 712/23; 712/216; 712/217; 712/218; 712/219; 712/200
[58] Field of Search ............... 395/800.23, 392, 395/393, 394, 395, 376; 712/23, 216, 217, 218, 219, 200

[56] References Cited

U.S. PATENT DOCUMENTS

| | | | |
|---|---|---|---|
| 5,446,912 | 8/1995 | Colwell et al. | 395/393 |
| 5,471,633 | 11/1995 | Colwell et al. | 395/800.23 |
| 5,490,280 | 2/1996 | Gupta et al. | 395/800.23 |
| 5,497,493 | 3/1996 | Colwell et al. | 395/800.23 |
| 5,499,352 | 3/1996 | Clift et al. | 395/393 |
| 5,517,651 | 5/1996 | Huck et al. | 395/570 |
| 5,524,262 | 6/1996 | Colwell et al. | 395/800.23 |
| 5,584,038 | 12/1996 | Papworth et al. | 395/800.23 |
| 5,781,753 | 7/1998 | McFarland et al. | 395/394 |

*Primary Examiner*—Emmanuel L. Moise
*Assistant Examiner*—Catherine M. Pries
*Attorney, Agent, or Firm*—Blakely, Sokoloff, Taylor & Zafman

[57] ABSTRACT

A processor for executing a plurality of instructions. The processor comprises a plurality of logical segment registers, wherein the logical segment registers define an architectural state for memory segmentation of the processor. A plurality of physical segment registers are coupled to the logical segment registers. The processor further comprises an issue cluster that issues the instructions and that maps the logical segment registers, specified by the operations, to the physical segment registers to provide segment register renaming in the processor.

1 Claim, 5 Drawing Sheets

SEGMENT REGISTER RENAMING IN AN OUT OF ORDER PROCESSOR

RELATED APPLICATIONS

This application is related to and claims the benefit of the filing date of United States Provisional Application Ser. No. 60/025,585, entitled SEGMENT REGISTER RENAMING IN AN OUT OF ORDER PROCESSOR, filed Sep. 6, 1996.

FIELD OF THE INVENTION

The present invention relates to memory segmentation in a processor capable of executing instructions out of order, and more specifically to segment register renaming in an out of order processor.

BACKGROUND OF THE INVENTION

Memory segmentation may be utilized for memory management in microprocessors. In general, memory segmentation allows management of the logical address space by providing data and code relocatability and efficient sharing of global resources. For example, in the Intel® architecture microprocessor, memory is organized into one or more variable length segments, each comprising up to four gigabytes in size. The segmented memory space may be divided into one or more pages. Typically, each segment stores information containing common attributes such as location, size, type (e.g. stack, code or data) and protection characteristics. Memory segmentation in the Intel® architecture microprocessor provides four levels of protection for isolating and protecting application programs and operating systems from conflict in the address space. The Intel® architecture microprocessor hardware enforced protection allows the design of systems with a high degree of integrity.

Microprocessors may utilize superscalar execution units to increase performance. In general, a superscalar processor is defined as a processor that contains more than one arithmetic logic unit (ALU). By providing more than one ALU, the processor exhibits the ability to execute instructions in parallel. Although employing a superscalar execution unit potentially provides the capability to execute more than one instruction in parallel, any given sequence of instructions may not be able to take advantage of this capability because the instructions are not independent of one another. Consequently, although a microprocessor may provide the capability to execute more than one instruction concurrently, interrelationships within the sequence of instructions prevents some instructions from being executed concurrently.

A reason that instructions may not be executed concurrently is the existence of conflicts between resource versions. Such conflicts are also known as false dependencies. A false dependency occurs when two instructions in the same sequence use different versions of the same resource at the same time. For example two load instructions, a first instruction in time and a second instruction in time, may use the same segment register to form their respective memory addresses. In this situation, an intervening write to the segment register file may cause the second load instruction to use a different segment register value (version) than the first load instruction. In order to overcome the resource conflict, execution of the second instruction may be delayed until the first instruction no longer uses the resource in contention. Because this delay adversely affects performance, it is desirable to eliminate the false dependencies. Register renaming is a technique that has been used for renaming resources in contention. Conventional register expensive in terms of hardware when applied to renaming segment registers.

SUMMARY OF THE INVENTION

A processor for executing a plurality of instructions is described. The processor comprises a plurality of logical segment registers, wherein the logical segment registers define an architectural state for memory segmentation of the processor. A plurality of physical segment registers are coupled to the logical segment registers. The processor further comprises an issue cluster that issues the instructions and that maps the logical segment registers, specified by the operations, to the physical segment registers to provide segment register renaming in the processor.

DETAILED DESCRIPTION

The processor of the present invention implements segment register renaming in a segment register file. In one embodiment, the processor comprises a superscalar and superpipelined processor performing both speculative execution and out-of-order dispatch and completion of instructions. For purposes of explanation, the processor is divided into an in-order portion and an out-of-order portion. The out-of-order portion of the processor performs out-of-order dispatch of instructions for execution in an appropriate execution unit. Because the instructions are dispatched out-of-order, instructions complete out-of-order. Out-of-order dispatch and completion increases performance by increasing parallelism in instruction execution.

In order to achieve increased performance of the out-of-order dispatch and completion operation in the processor of the present invention, an execution unit permitting parallel processing of instructions is provided in one embodiment. In one embodiment, the execution unit is superscalar. The superscalar execution unit contains multiple arithmetic logic units (ALUs). The superscalar execution unit supports the out-of-order dispatch and completion operation of the processor by providing parallelism in that more than one computation may occur simultaneously.

In order to support the out-of-order portion, the processor implements speculative execution in the in-order portion of the processor. The implementation of speculative execution permits the in-order portion of the processor to provide a continuous stream of instructions to the out-of-order portion. The use of speculative execution increases available parallelism in the execution unit.

In one embodiment, the processor is implemented as a superpipelined processor. In a superpipelined processor, the processing stages are divided into several different substages. The superpipelined processor contains more pipestages than a conventional pipelined processor. However, for the superpipelined processor, the processor is constructed to perform less work per clock stage than a conventional pipeline processor. To further benefit from the superpipelined implementation, the present invention processor operates at high clock frequencies. In addition, the superpipelined processor provides good branch prediction that is necessary in a processor implemented with a deep pipeline to reduce penalties caused from an incorrect branch prediction.

The in-order portion of the processor is constructed to issue a steady flow of instructions to support the out-of-order portion of the processor. In order to accomplish this task, the in-order portion of the processor supports speculative execution via branch prediction for branch instructions. The in-order portion of the processor supports renaming of resources, including registers in the register file and registers in the segment register file. As is explained more fully below, the use of register renaming, including segment register renaming permits more parallel execution of instructions than a processor without register renaming. In addition, the processor re-imposes the original program order of instructions after the instructions are executed, potentially out of the original program order. Furthermore, for an implementation supporting the Intel® architecture microprocessor, the in-order portion of the processor maintains a precise fault model.

The memory subsystem of the present invention provides appropriate bandwidth to support the out-of-order portion of the processor. Because the processor of the present invention supports out-of-order dispatch and completion, the memory subsystem enforces ordering to maintain data integrity in the memory system. For example, a first store operation cannot pass a second store operation to the same address if the first store operation came before the second store operation in the original program order. The memory subsystem of the present invention supports speculative execution, such that speculative store operations are not executed.

Figure 1:
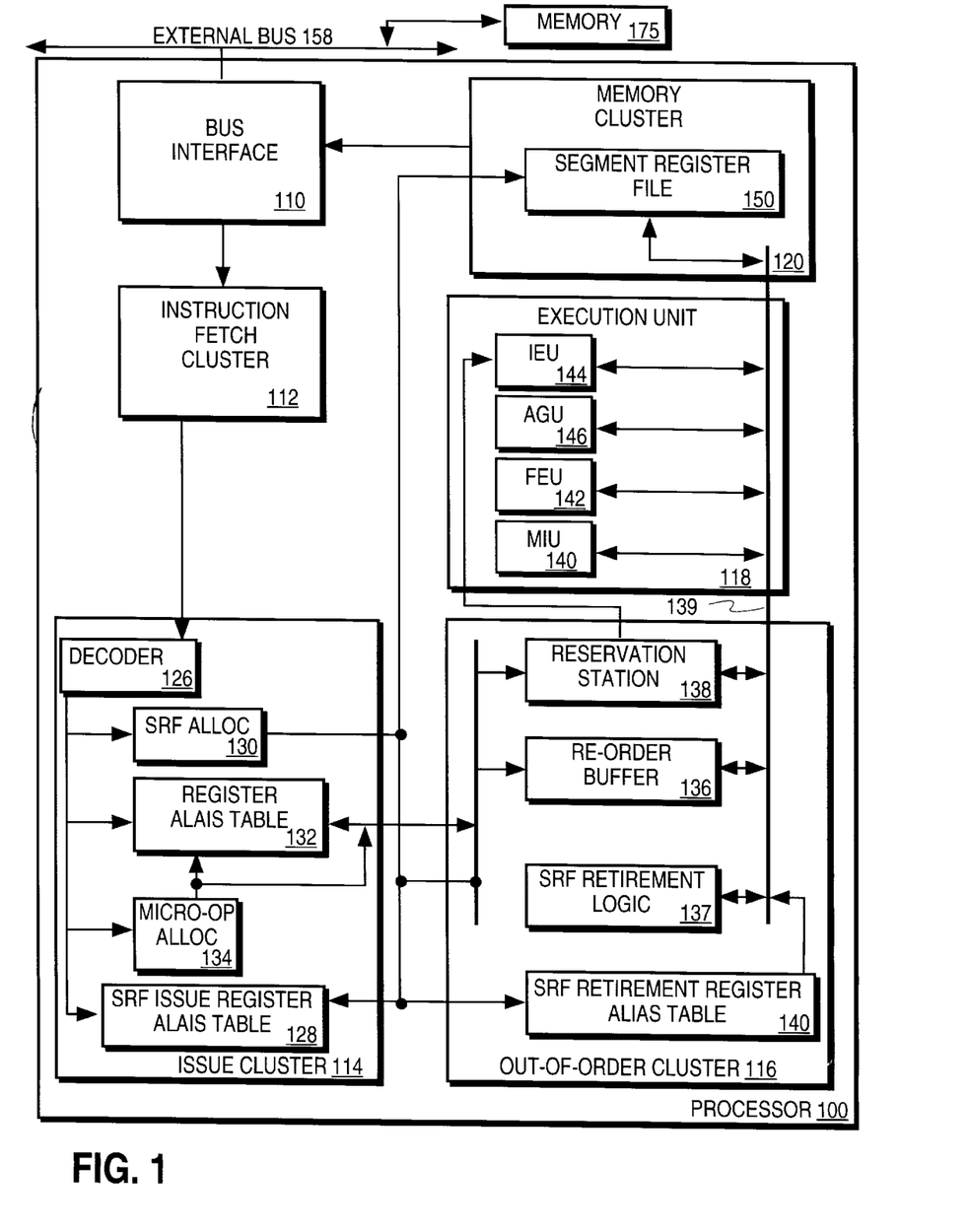
FIG. 1 illustrates a superscalar microprocessor implementing segment register renaming in accordance with one embodiment of the present invention.

FIG. 1 illustrates a superscalar microprocessor implementing segment register renaming in accordance with one embodiment of the present invention. A processor 100 may be compatible with, but not limited to, microprocessors such as an Intel® Architecture Microprocessor, manufactured by Intel Corporation of Santa Clara, California, the corporate assignee of the present invention, PowerPC™, Alpha™, etc. For the embodiment illustrated in FIG. 1, the in-order portion of the processor 100 is implemented with an instruction fetch cluster 112 and issue cluster 114. The out-of-order portion of processor 100 includes the out-of-order cluster 116, execution cluster 118, and a memory cluster 120. In addition, a bus interface 110 provides an interface for external operations.

In general, the instruction fetch cluster 112 fetches a continuous flow of instructions including providing branch prediction to support speculative execution in the processor. The issue cluster 114 receives instructions from the instruction fetch cluster 112 and prepares the instructions for the out-of-order cluster 116, execution cluster 118, and memory cluster 120. The issue cluster 114 is the last functional cluster within the in-order portion of the processor 100. The issue cluster 114 includes, in relevant part, an instruction decoder 126, a register alias table (RAT) 132, and an allocator (ALLOC) 134. In order to support segment register renaming, the issue cluster 114 contains a segment register file allocator (SRF ALLOC) 130 and a segment register file issue register alias table (SRFIRAT) 128.

The issue cluster 114 converts a stream of macro instructions into micro instructions or micro operations (micro-ops) in the decoder 126. In one embodiment, the decoder 126 decodes macro instructions compatible with the Intel® Architecture Microprocessor. However, the decoder 126 may be constructed to decode instructions for any CISC or RISC instruction set, including but not limited to PowerPC™, Alpha™, etc., without deviating from the spirit and scope of the invention.

The out-of-order cluster 116 contains a reservation station (RS) 138, reorder buffer (ROB) 136, retirement logic 137, and a segment register file retirement register alias table (SRFRRAT) 140 as shown in FIG. 1. The ROB 136 includes a real register file that defines the architectural register set for the processor. In one embodiment, the architectural register set is compatible with the Intel® Microprocessor Architecture. However, the architectural register set may be compatible with any microprocessor, including but not limited to PowerPC™, Alpha™, etc., without deviating from the spirit and scope of the invention.

In general, the out-of-order cluster 116 receives micro-ops from the issue cluster 114. The out-of-order cluster 116 merges the in-order stream of micro-ops with corresponding source data provided by the ROB 136 and captured in the RS 138. In one embodiment, for a memory operation the data are not captured in the RS 138 but are dispatched from the segment register file 150. The processor of the present invention uses a data flow architecture by executing ready/schedule, dispatch, and retirement operations. In order to perform the ready/schedule function, the RS 138 identifies all ready to execute micro-ops, and selects certain micro-ops for dispatch to the execution cluster 118. The micro-ops are executed in an execution unit in the execution cluster 118, and result data are written back to the out-of-order cluster 116. The ROB 136 and retirement logic 137 retire the micro-ops, by transferring the result data to the real register file, in the original program order.

In order to perform the issue function implemented in the issue cluster 114, control information is written in allocated ROB 136 entries and an associated ready bit is cleared. For each micro-op, an op code, source data, source/destination addresses, and other control information are written into allocated RS 138 entries. For a memory operation, a physical segment register number and validity are stored. Source data for the execution units originates from the ROB 136, a real register contained within the ROB 136, or the segment register file 150. Consequently, source data entries in the RS 138 contain a bit to identify whether the source data is stored in the ROB 136 or in the real register file. The validity bit in the ROB 136 indicates whether the corresponding source data entry is valid.

Specifically, in order to schedule micro-ops for the execution units in the execution cluster 118, the RS 138 ascertains which micro-ops are data ready by evaluating a corresponding data valid bit for each piece of source data. The RS 138 then determines availability of execution units for data ready micro-ops and schedules the micro-ops based on a priority pointer. For the scheduled micro-ops, the RS 138 dispatches the micro-ops and associated source data to the appropriate execution unit. For a memory operation, data are dispatched from the segment register file 150 to the address generation unit (AGU) 146 in the execution cluster 146.

Upon completion of execution of micro-ops in the execution cluster 118, the execution units transmit pointer addresses to the ROB 136 prior to writing the actual result data. The pointer addresses identify ROB 136 entries that are the destinations for the writeback data results. Subsequently, the execution unit writes result data to the specified ROB 136 entry. The RS 138 snoops a write back bus 139 so as to capture data required for other micro-ops.

In order to perform the retirement function, a number of consecutive entries are read out of the ROB 136 based on the physical destination identifications. The entries read from the ROB 136 are candidates for retirement. A micro-op is a candidate for retirement if a corresponding ready bit is set, the micro-op does not cause an exception, and all preceding micro-op candidates, in the original program order, are eligible for retirement. When a micro-op is eligible for retirement, the RAT 132 is notified to update the look-up table, and data are transferred from the ROB 136 to a real register file (RRF). A retirement pointer is incremented in the ROB 136 to indicate that the ROB entry has retired. In addition, the SRFRRAT 140 updates a look-up table to reflect the logical to physical segment register mapping at retirement of the corresponding micro-op.

In one embodiment, the execution cluster 118 contains four semi-autonomous units: an address generation unit (AGU) 146, an integer execution unit (IEU) 144, a floating point execution unit (FEU) 142, and a memory interface unit (MIU) 140. Although the execution cluster 118 is described in conjunction with four execution units, the execution cluster 118 may comprise any number and type of execution unit without deviating from the spirit and scope of the invention.

The AGU 146 supports the segmentation addressing for the Intel® architecture microprocessor by calculating an effective address. In order to support segmentation for the Intel® architecture microprocessor, the AGU 146 is coupled to the segment register file 150. The processor of the present invention is superscalar in that the IEU 144 contains two arithmetic logic units (ALUs) to add, subtract, shift and perform logical operations on source operands. In addition, the IEU 144 contains a jump execution unit for branch prediction calculations. The PEU 142 provides floating point support for the processor. The MIU 140 provides an interface for all memory transactions including executing floating to integer conversions, integer to floating conversions, such as converting one floating point data type to another.

The memory cluster 120 contains the memory pipeline to dispatch memory operations to the memory 175. In addition, the memory cluster 120 supports the out-of-order dispatch operation of the present invention. In one embodiment of the present invention, the memory cluster 120 includes a segment register file 150. The memory cluster 120 also includes a data translation lookaside buffer (DTLB) 154, a data cache unit (DCU), a page miss handler, and a memory order buffer (MOB) (now shown in FIG. 1). In addition, the memory cluster 120 operates in conjunction with the AGU 146 and the MIU 140. The memory cluster 120 contains a memory dispatch bus 151 and a writeback bus 139.

As discussed above in conjunction with the execution cluster 118, the AGU 146 generates the appropriate linear address for memory operations. The DTLB 154 translates the linear address into a physical address. If a page miss occurs, then the DTLB 154 forwards the page miss to the PMH 152. In response, the PMH 152 performs well-known functions for handling page misses, such as "page walking" for example. In general, the MOB 150 buffers all store and load operations, and controls dispatching of the load and store operations. In addition, the MOB 150 tracks the progress of memory operations through execution, and retires the memory operations, when appropriate, by committing results to a memory state. Upon retirement of a store operation, the MOB 150 dispatches the store operation in a "background" mode of operation at the convenience of the memory system.

The memory cluster 120 supports speculative execution. Because some memory operations cannot execute speculatively, the MOB 150 monitors and subsequently dispatches non-speculative operations at the correct time. For example, the MOB 150 snoops the source addresses of instructions fetched and signals the bus interface 110 to stall an instruction fetch whenever the source address instruction being fetched substantially matches any of the addresses of the store destinations of the buffered stored instructions.

As discussed above, the processor of the present invention utilizes a data flow architecture, such that operations are postponed until the corresponding data operands are available. Consequently, when the data operands are available, operations are executed, potentially out-of-order. The data operand dependency is tracked on a register basis, such that if previous values of a register are computed, then the data operand dependencies are satisfied. However, memory operations have implicit dependencies. For example, load operations have a dependency on any previous store operation having a common address with the load operation. The MOB 150 stores speculative memory operations, both load and store operations, so as to avoid dispatching stale data to system memory, and consequently producing incorrect results.

In order to maintain consistency between load and store operations, the processor of the present invention employs a concept known as store coloring. The store coloring scheme is utilized to maintain an ordering consistency between loads and stores of the same processor. Each load operation is tagged with a store buffer identification (ID) corresponding to the previous store. The store buffer ID represents the relative location of the load compared to all stores in the execution sequence. When the load executes in the memory cluster 120, the MOB 150 utilizes the store buffer ID as the beginning point for analyzing the load against all older stores in the buffer. When a memory operation is dispatched but cannot complete due to an address or resource conflict, the MOB 150 blocks the operation and stores dependency information. When the blocking source is removed, the MOB 150 again dispatches memory operations.

In computer systems utilizing multi-processors, order consistency problems also occur. If load operations execute out-of-order, the load operation can effectively make another processor store operation appear out-of-order. For example, if a second load operation executes prior to a first load operation, and the first load operation appears before the second load operation in the original program order, then the load operations appear out-of-order to the original program order. In this case, the second load operation retrieves old data, while the first load operation, once executed, may possibly read new data written by another processor. If allowed to commit to memory state, the load operations would violate processor ordering. In order to prevent the violation, the MOB 150 snoops all data writes by other processors on the bus. Consequently, if another processor writes a location that was speculatively read, the load and subsequent operations are cleared and reexecuted to retrieve the correct data.

The bus interface 110 provides an interface to external devices for the processor 100. The bus interface function may be accomplished through any bus interface without deviating from the spirit and scope of the invention. In one embodiment, the bus interface function is implemented with a transactional oriented bus. As shown in FIG. 1, the processor 100 interfaces with external devices, such as main memory, via an external bus 158.

Memory segmentation of the present invention is described in conjunction with the Intel® architecture microprocessor. However, any memory segmentation scheme may be implemented in accordance with the teachings herein without deviating from spirit and scope of the invention. The Intel® architecture microprocessor contains three distinct address spaces: logical, linear and physical. A logical address, or virtual address, consists of a selector and an offset. The selector is stored in a segment register. An offset is formed by summing all of the addressing components (base, index, displacement) into an effective address.

In order to generate a physical address for a physical memory, an effective address calculator generates the virtual or logical address. A segment register contained within the segment register file 150 (FIG. 1) stores the contents of the selector and, in protected mode, a descriptor containing type, base limit and protection information. The effective address calculator and the segment register are coupled to a segmentation unit. The segmentation unit translates the logical address space into a linear address space. If paging is utilized in the microprocessor, then the linear address is input to a paging unit. The paging unit translates the linear address space into the physical address space. The physical address is transmitted to physical memory to access the memory. If the paging unit is disabled, then the linear address corresponds to the physical address.

Protected mode segmentation provides the basis for software address protection in the microprocessor. Segments are used to encapsulate regions of memory that have common attributes. For example, all of the code for a given application program may be contained in a single segment, or an operating system table may reside in a single segment. All information corresponding to a segment is stored in an 8 byte data structure called a descriptor. All of the descriptors for a particular system are contained in tables for recognition by the microprocessor. In one embodiment, the descriptor tables define all of the segments that are used in the microprocessor system. In this embodiment, the microprocessor utilizes three tables that store descriptors: the global descriptor table, the local descriptor table and the interrupt descriptor table. All of the descriptor tables are variable length memory arrays. The upper 13 bits of a selector are used as an index into the descriptor table. The tables include registers that store the 32 bit linear base address and the 20 bit limit of each table.

In one embodiment, the segment selectors are stored in six 16 bit segment registers in the segment register file 150. In protected mode, each segment may range in size from 1 byte up to the entire linear and physical address range of the microprocessor. In real mode, the maximum segment size is fixed at 64 kilobytes. The six addressable segments are defined by the segment registers: CS, SS, DS, ES, FS, and GS. The selector in CS register indicates the current code segment; the selector in SS indicates the current stack segment; and the selectors in DS, ES, FS and GS indicate the current data segments.

Each descriptor register holds a 32 bit base address. In one embodiment, each descriptor register holds a 32 bit limit. In the segment descriptor in memory there are only 20 bits of segment limit, but an additional granularity bit ("G" bit) indicates whether the segment limit in the segment descriptor in memory should be interpreted in terms of bytes or pages. In the latter case, the limit is multiplied by $2^{\wedge}12$, the page size. It is therefore convenient to keep a single 32 bit representation of the limit. For this and other reasons, the representation of the segment descriptor inside the processor may be larger than the 64 bits stored in memory.

When a selector value is loaded into a segment register, the associated descriptor register is updated with the correct information. In real address mode, only the base address is updated directly by shifting the selector value 4 bits to the left. In protected mode, the base address, the limit, and the segment attributes are updated based the contents of the segment descriptor. Whenever a memory reference occurs, the segment descriptor register corresponding to the segment register accessed is involved with the memory reference. The 32 bit segment base address becomes a component of the linear address calculation, and the 32 bit limit is utilized to insure that the access does not require data located beyond the end of the segment.

Figure 2:
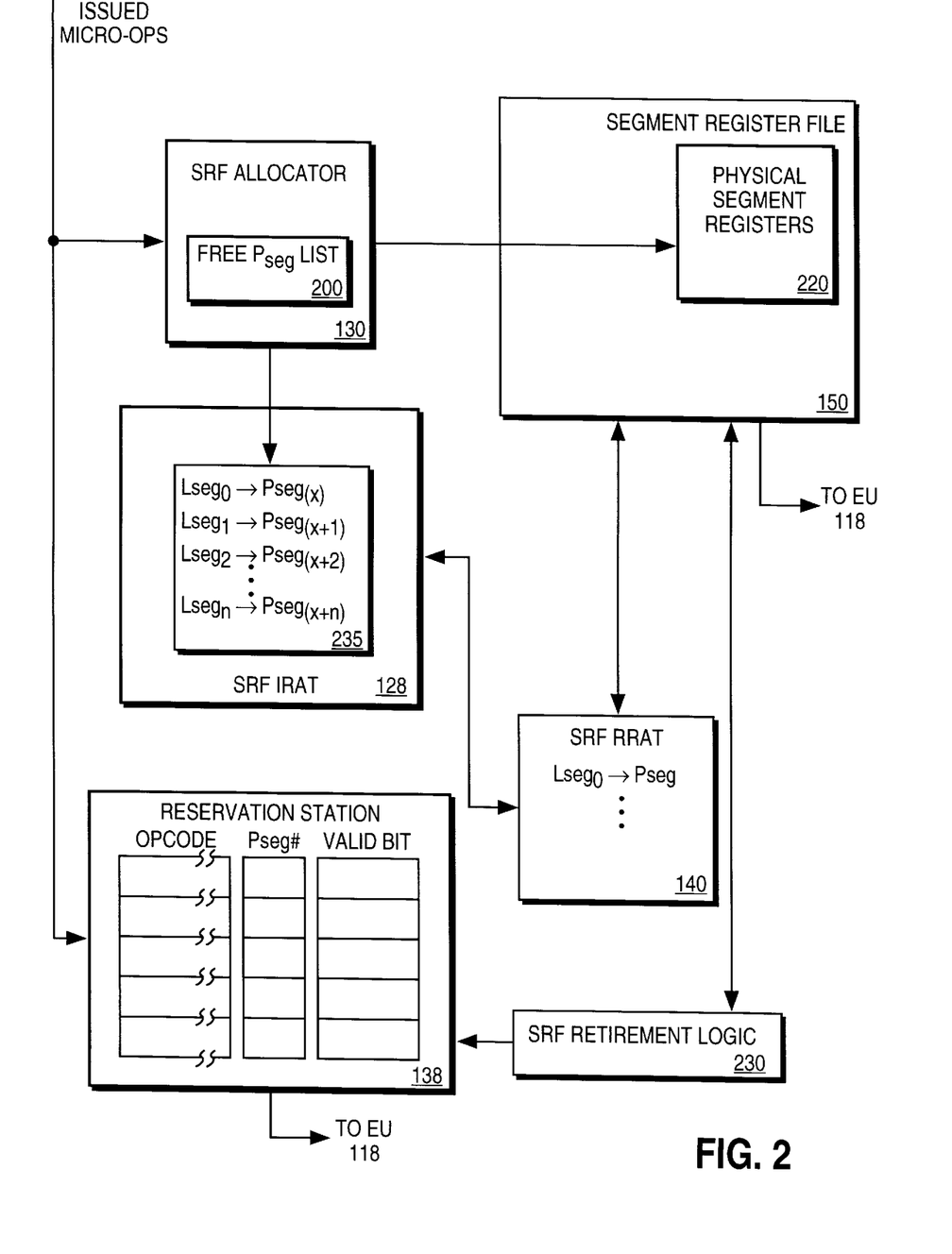
FIG. 2 illustrates a portion of a microprocessor used in one embodiment of segment register renaming of the present invention.

FIG. 2 illustrates a portion of the microprocessor 100 utilized in one embodiment of segment register renaming of the present invention. As shown in FIG. 2, the segment register file (SRF) allocater 130 includes a free physical segment (Pseg) list 200. For each micro-op that writes to a logical segment register, the SRF allocator assigns a new physical segment register that is not currently in use and prepares to re-allocate the old physical segment register that was mapped to the logical segment register. In one embodiment, the free Pseg list 200 comprises a FIFO buffer memory. After retirement of a micro-op that wrote to a logical segment register, the old physical segment register that mapped to the logical segment register is placed into the FIFO. For a new micro-op that writes to a logical segment register, the SRF allocator reads the entry from the FIFO memory.

The SFR allocater 130 is coupled to the segment register file issue register alias table (SRFIRAT) 128 to receive physical segment register assignments for each issued micro-op that writes to a segment register. The SRFIRAT 128 contains a segment register file issue register alias table (SRF IRAT) array 235. As shown as in FIG. 2, the SRFIRAT array 235 provides a mapping between logical segment registers (Lsegs) and physical segment registers (Psegs) during issuance of the micro-ops. For example, the logical segment register "0" (Iseg$_0$) is mapped to the physical segment register (Pseg$_x$). Although the physical segment registers illustrated in the SRFIRAT array 235 are labeled as Pseg$_{(x)}$ to Pseg$_{x+n}$, the physical segment registers are not necessarily assigned in a linear order. As is described more fully below, the physical segment registers are assigned from the free Pseg list 200.

As shown in FIG. 2, issued micro-ops are input to the reservation station (RS) 138. In order to perform register renaming, the RS 138 contains, for each micro-op that writes to a segment register, a physical segment number (Pseg #) field and a corresponding valid bit. The physical segment number (Pseg #) field indicates the physical segment register assigned for the corresponding micro-op at issue and the valid bit indicates whether the contents of the physical segment register are valid for dispatch to the execution unit (EU) 118.

A portion of the segment register file 150 is also shown in FIG. 2. The segment register file 150 contains a plurality of physical segment registers of 220. The physical segment registers 220 are configured such that the contents of each logical segment register may be transferred to a physical segment register, and the contents of each physical segment register may be transferred to any logical segment register. The physical segment registers 220 each contain a valid bit. The valid bit, set at retirement of the corresponding micro-op, indicates whether the contents in the corresponding physical segment register are valid.

The SRF retirement logic 230 shown in FIG. 2 determines which physical segment registers are valid. Generally, no write to a physical segment register is allowed prior to a read of that physical segment register has been completed. This insures that read operations from the segment register file 150 are executed with the proper data. Consequently, the validity setting for each physical segment register number stored in the reservation station insures proper ordering in the out of order issue microprocessor. Also, during retirement, the SRF retirement logic 230 indicates that the physical segment register assigned to the retiring micro-op is free for subsequent allocation.

Figure 3:
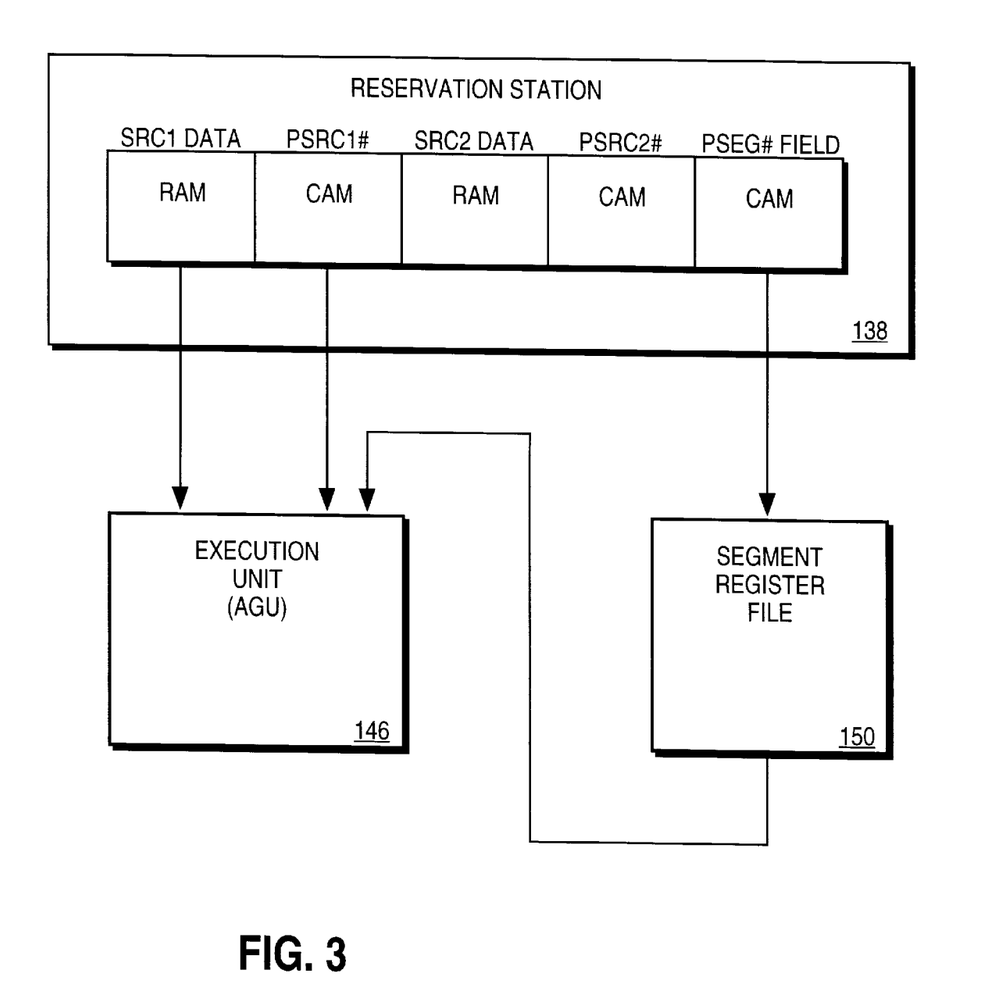
FIG. 3 illustrates one embodiment of a reservation station configured for segment register renaming according to the present invention.

FIG. 3 illustrates reservation station 138. As shown, reservation station 138 contains random access memory cells that store source one data (SRC1 DATA) and source two data (SRC2 DATA) fields. In this embodiment, there is no RAM to store the segment register data. Instead, the segment register data is read after the micro-operation is dispatched from the scheduler.

Reservation station 138 contains addressable memory for the physical source one register number (PSRC1#) and physical source two register number (PSRC2#) fields, as well as the physical segment register number (PSEG#) field.

In one embodiment of reservation station 138, a number of any new physical register is compared, as it is written, by (content addressable memory (CAM) logic at each reservation station entry to the PSRC1# and PSRC2# fields. Similarly, the number of any new physical segment register is compared to the PSEG# field of each reservation station entry. The results of these comparisons are used to set a corresponding valid bit for each input operand (not shown).

In another embodiment of reservation station 138, a wire for each physical segment register is sent across the reservation station. This wire is asserted if a physical segment register is valid in this case CAM logic at each reservation station entry specifies which physical segment registers (if any) are required as inputs by the micro-operation.

Figure 4:
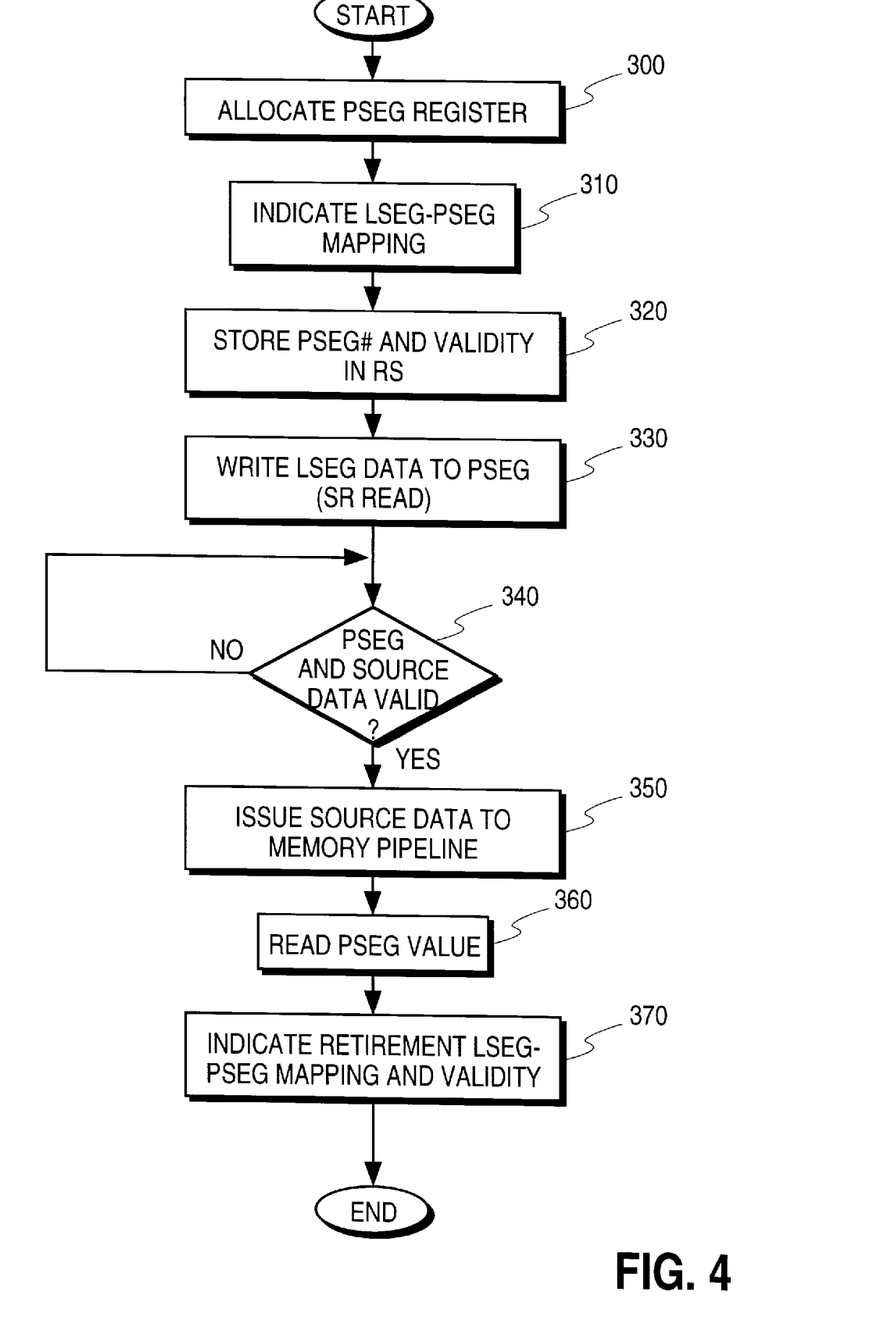
FIG. 4 illustrates a flow of a micro-op that incorporates segment register renaming in accordance with one embodiment of the present invention.

FIG. 4 illustrates the flow of a micro-op that incorporates segment register renaming in accordance with one embodiment of the present invention. After decoding a micro-op that writes a segment register, a physical segment register (pseg) is allocated for the corresponding micro-op as shown in block 300. Based on the physical segment register assigned, an indication of the logical segment register to physical segment register mapping at issue is noted as shown in block 310. In addition to storing other information in the reservation station, the physical segment register number (pseg#) field and corresponding valid bit are set in the reservation station as show in block 320. If the micro-op involving the segment register requires reading from a logical segment register, then the contents of the logical segment register are transferred to the assigned physical segment register as shown in block 330.

In decision block 340, if the contents of the physical segment register and source data are valid for the corresponding micro-op, then the micro-op is issued to the memory pipeline. In addition, the physical segment register is read and dispatched to the memory pipeline as shown in block 360. When the micro operation completes in the memory pipeline and when the micro-op retires, an indication is noted in the logical segment register to physical segment register mapping at retirement. Also, based on the retired micro-ops, validity for pending micro-ops involving physical segment registers are determined.

As discussed above, in one embodiment, the processor 100 (FIG. 1) performs speculative execution of instructions through use of branch target prediction. In addition to predicting paths of execution, the processor 100 includes a mechanism to recover if the prediction was incorrect. As discussed above, the SRFIRAT 128 stores a mapping between logical segment registers and physical segment registers at issue, and the SRFRRAT 140 stores a mapping between logical segment registers and physical segment registers at retirement. If a branch is mispredicted such that the processor 100 executed instructions down an incorrect path, the mapping between logical segment registers and physical segment registers in the SRFRRAT 140 is transferred to the SRFIRAT 128. Also, all physical segment registers allocated to micro-ops that have not yet retired are entered onto the free Pseg list 200 (FIG. 2).

Figure 5:
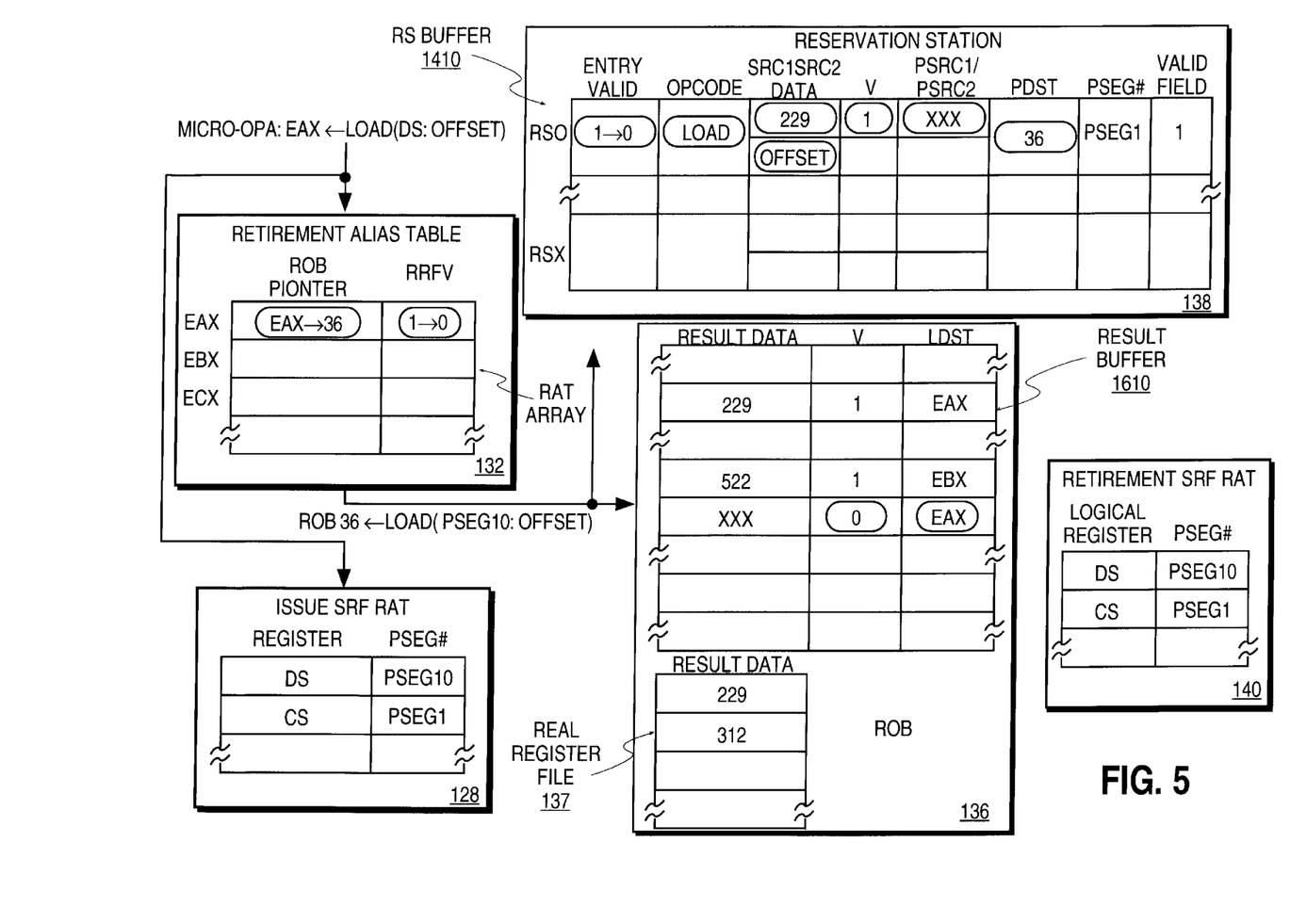
FIG. 5 illustrates a data flow architecture example for processing a logical micro-op that writes to a segment register in accordance with one embodiment of the present invention.

FIG. 5 illustrates a data flow architecture example for processing a logical micro-op that utilizes a segment register in accordance with one embodiment of the present invention. Although the following example is illustrated with a specific logical and physical micro-op, any format of the micro-op may be used without deviating from the spirit and scope of the invention. The logical micro-op, (EAX=load (DS: Offset)), specifies retrieving, from memory 140, the contents located in the DS segment at the specified offset, and storing the contents in the EAX register. In order to process the example micro-op, the micro-op ALLOC 134 receives the logical micro-op (EAX=load(DS: Offset)), and generates a physical destination (Pdst) equal to 36. The physical destination (Pdst) 36 indicates that the physical register 36 in the ROB 136 is free for allocation. Also, the SRF ALLOC 130 receives the logical micro-op (EAX=load (DS: Offset)), and assigns a physical segment register (pseg10) for the logical DS segment register. The pseglo register is obtained from the free Pseg list 200 (FIG. 2). The SRF ALLOC 130 transfers the DS logical segment register to pseglo physical segment register assignment to the segment register file 150. For a segment register read, the contents of the DS segment register in the segment register file 150 are transferred to the pseg10 register.

The micro-op ALLOC 134 transfers the Pdst 36 to the micro-op RAT 132 and the issue SRF RAT 128. The micro-op RAT 132 receives the Pdst 36, and translates the logical micro-op add (EAX=load(DS: Offset)) into a physical micro-op (ROB 36=load(pseg10: Offset)). As shown in FIG. 5, the issue SRF RAT 128 is updated to indicate that the logical register DS is assigned the physical segment register "pseg10" for the micro-op. Because the RRFV flag for the EAX entry in the micro-op RAT 132 is set, the argument eax/rrfv specifies that physical source one (psrc1) resides in the EAX entry of the real register file (RRF) 137. The argument 35 in the micro-op RAT 132 specifies that physical source two (psrc2) resides in entry RE35 in the ROB 136 as indicated by the RRFV flag for the EBX entry in the micro-op RAT 132. The micro-op RAT 132 stores the allocated Pdst 36 for the physical micro-op (ROB 36=load (pseg10: offset)) into the ROB pointer field of the EAX entry in the micro-op RAT 132. The micro-op RAT 132 also clears the RRFV bit for the EAX entry in the RAT array 1220 to indicate that the logical register EAX is mapped to the ROB 136 in a speculative state.

The micro-op RAT 132 transfers the physical micro-op, (ROB 36=load (pseg10: Offset)), to the RS 138 and the ROB 136. The ROB 136 receives the physical micro-op (ROB 36=load(pseg10: Offset)), and reads source data for the physical source psrc1 eax/rrfv by retrieving the EAX entry in the RRF 137. The ROB 136 reads source data for the physical source psrc2 by retrieving ROB entry RE35 in the result buffer 1610. The EAX entry of the RRF 137 contains a data value equal to 229 for the committed state of the EAX architectural register. The ROB entry RE35 of the result buffer 1610 contains a result data value equal to 522, and a set valid bit indicating the current speculative state of the EBX architectural register. The ROB 136 also stores the logical destination EAX into the LDST field of the RE36 entry of the result buffer 1610, and clears the valid flag in the RE36 entry to indicate that the corresponding result data is not valid. In addition, the ROB 136 transfers source data (src1), 229, and source data (src2), 522, and corresponding valid bits, to the RS 138.

The RS 138 receives the (ROB 36=load(pseg10: Offset)) physical micro-op, and stores the load opcode into the opcode field of the RS0 entry in the RS buffer 1410 as specified by the ALLOC 134. The RS 138 also stores the physical destination (Pdst) 36 into the PDST field of the RS0 entry, and stores the physical source locations, "xxx" for psrc1, and "35" for psrc2, into the PSRC1/PSRC2 fields of entry RS0. In order to perform segment register renaming, the pseglo assignment for the physical segment register is stored in the pseg# field in the RS0 entry. For this example, the segment register file 150 sets the SRFV bit valid in the RS0 entry to indicate that the contents of the pseg10 register are valid. The RS 138 sets the entry valid flag for the RS0 entry. In addition, the RS 138 receives the source data values, 229 for src1, and 522 for src2, as well as corresponding valid flags. The RS 138 stores the source data values and corresponding valid flags into the SRC1/SRC2 and V fields, respectively, of the RS buffer 1410 entry RS0.

The (ROB 36=load(pseg10: Offset)) physical micro-op, residing in entry RS0 in the RS buffer 1410, is ready for dispatch to the memory pipeline because the source data is fully assembled, as indicated by the source data valid bit (V) for each source data, and the pseg10 entry is valid. In order to dispatch the micro-op, the RS 138 generates dispatched physical micro-op (ROB 36=load(pseg10: Offset)) by reading the OPCODE, SRC1/SRC2, PDST, and PSEG# fields of entry R0 in the RS buffer 1410 during a first pipe stage. During this pipestage, the OPCODE, SRC1/SRC2, and fields are transferred to the memory pipeline, and the PSEG# field is transferred to the segment register file. In a subsequent pipestage, the contents of the pseg10 are utilized to transfer data to the memory pipeline. The RS 138 clears the entry valid flag of entry RS0 to enable allocation of the RS0 entry for use by a subsequent physical micro-op. In addition, the RS 138 notifies the ALLOC 134 of the physical micro-op dispatch, and thereafter, the ALLOC 134 allocates the RS0 entry to a subsequent physical micro-op.

The (ROB 36=load(pseg10: Offset)) micro-op executes in the memory pipeline. The data loaded from memory is written to the RE 36 register in the result buffer 1610. If all prior micro-ops in the ROB 136 have retired, then the (ROB 36=load(pseg10: Offset)) micro-op is ready for retirement. In order to retire the micro-op for segment register renaming, the retirement SRF RAT 140 indicates the logical segment register to physical segment register mapping for the retired micro-op. As shown in FIG. 5, the retirement SRF RAT 140 stores the logical segment register "DS" to physical segment register "pseg10" mapping. Also, as discussed above, the SRF retirement logic 230 determines whether any RS entry, issued after the micro-op, specifies a read to the same logical register (e.g. DS). If so, valid bits for the physical segment registers are updated accordingly. Furthermore, the physical segment register retired is added to the free pseg list.

In the preferred embodiment discussed above, the reservation station 138 stores only the physical segment number (pseg#) and a corresponding valid bit, and the physical segment register data are stored in the physical register located in the segment register file 150. Storing the physical segment register data in the segment register file 150 reduces the actual size required to implement the reservation station 138. However, for the preferred embodiment, an additional pipestage is required to read the data from the segment register file 150 after the micro-op is issued from the reservation station 138.

In an alternative embodiment, physical segment register data are stored in the reservation station 138. The operation of a reservation station storing physical segment data is analogous to storing source one (SRC1) and source two (SRC2) data in the reservation station 138 (FIG. 2). For an Intel® architecture microprocessor implementation of the alternative embodiment, the reservation station stores 16 bits of selector data when operating in real or virtual 8086 modes. When the processor is operating in protected mode, the reservation station stores 64 bits of descriptor data. For the alternative embodiment, an additional pipestage is not required to retrieve data from the segment register file 150 when dispatching the micro-op from the reservation station 138.

In other embodiments, a combination of storing physical segment register data in the reservation station and storing physical segment register data in the segment register file may be used.

The Intel® architecture microprocessor provides four hierarchical privilege or protection levels. The privilege levels range from 0–3 such that level 0 represents the highest privilege level, and level 3 represents the lowest privilege level. When operating in protected mode, the segments contain descriptor privilege level (DPL) bits. The DPL contains a two bit field that specifies the protection level associated with the corresponding segment. In order to provide protection for control transfer among executable segments at different privilege levels, the Intel® architecture microprocessor utilizes gate descriptors. The gate descriptors consist of four types: call gates, trap gates, interrupt gates, and task gates. In general, call gates are utilized for control transfers between different privilege levels. In one embodiment of segment register renaming of the present invention, micro-ops that use segment registers and that require protective checking are serialized such that the micro-ops are executed in the order issued.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A processor for executing a plurality of instructions, the processor comprising:

a plurality of logical segment registers, wherein the logical segment registers define an architectural state for memory segmentation of the processor;

a plurality of physical segment registers coupled to the logical segment registers; and an issue cluster configured to issue the instructions and map the logical segment registers to the physical segment registers at least one execution unit configured to execute operations to generate result data; and an out-of-order cluster coupled to the execution unit and the issue cluster configured to dispatch instructions issued based upon data dependencies of the operations and availability of the execution unit, such that the instructions are dispatched to an execution unit out of an original program order, the out-of-order cluster being constructed to re-order the operations executed in the original program order so as to commit the result data to an architectural state of the processor in the original program order, wherein the out-of-order cluster comprises a segment register file retirement register alias table (SRFRRAT) configured to store a mapping of the logical segment registers to the physical segment registers at retirement of the operations.

* * * * *

UNITED STATES PATENT AND TRADEMARK OFFICE
CERTIFICATE OF CORRECTION

PATENT NO.   : 5,951,670
DATED        : September 14, 1999
INVENTOR(S)  : Glew et al.

It is certified that error appears in the above-identified patent and that said Letters Patent is hereby corrected as shown below:

Column 5,
Line 40, delete "PEU", insert -- FEU --.
Line 54, delete "now", insert -- not --.

Column 8,
Line 66, after "registers", delete "of".

Signed and Sealed this

Twenty-ninth Day of July, 2003

JAMES E. ROGAN
*Director of the United States Patent and Trademark Office*